(12) United States Patent
Smith et al.

(10) Patent No.: US 12,435,664 B2
(45) Date of Patent: Oct. 7, 2025

(54) GAS TURBINE ENGINE WITH WATER RECOVERY SYSTEM

(71) Applicant: Pratt & Whitney Canada Corp., Longueuil (CA)

(72) Inventors: Scott Smith, St-Lambert (CA); Russell Stratton, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/211,092

(22) Filed: Jun. 16, 2023

(65) Prior Publication Data

US 2024/0418121 A1 Dec. 19, 2024

(51) Int. Cl.
*F02C 3/30* (2006.01)
*F02C 3/22* (2006.01)
*F02C 7/18* (2006.01)
*F02C 7/22* (2006.01)

(52) U.S. Cl.
CPC .................. *F02C 3/30* (2013.01); *F02C 3/22* (2013.01); *F02C 7/18* (2013.01); *F02C 7/22* (2013.01); *F05D 2260/213* (2013.01); *F05D 2260/2322* (2013.01); *F05D 2260/606* (2013.01); *F05D 2260/609* (2013.01)

(58) Field of Classification Search
CPC ......... F05D 2220/323; F05D 2260/211; F05D 2220/72; F05D 2220/32; F05D 2220/60; F02C 7/141; F02C 3/22; F02C 7/16; F02C 3/30; F02C 7/18; F02C 7/22; F01K 15/02
See application file for complete search history.

(56) References Cited

U.S. PATENT DOCUMENTS

| | | |
|---|---|---|
| 9,765,691 B2 | 9/2017 | Delgado |
| 9,932,124 B2 | 4/2018 | Kamath |
| 11,041,439 B2 | 6/2021 | Roberge |
| 11,047,307 B2 | 6/2021 | Roberge |
| 11,542,869 B2 | 1/2023 | Smith |

(Continued)

FOREIGN PATENT DOCUMENTS

| | | | | |
|---|---|---|---|---|
| DE | 112021007147 T5 | * 12/2023 | ................ | F02C 7/22 |
| EP | 3048281 A1 | * 7/2016 | ............. | F01D 25/32 |

(Continued)

OTHER PUBLICATIONS

EP Search Report for EP Patent Application No. 24182412.7 dated Feb. 18, 2025.

*Primary Examiner* — Craig Kim
(74) *Attorney, Agent, or Firm* — Getz Balich LLC (57) ABSTRACT

An engine system is provided that includes an open propulsor rotor, an engine core assembly, a bypass flowpath and a condenser. The engine core assembly is configured to drive rotation of the open propulsor rotor. The engine core assembly includes a core flowpath, a compressor section, a combustor section and a turbine section. The core flowpath extends through the compressor section, the combustor section and the turbine section from an inlet into the core flowpath to an exhaust from the core flowpath. The bypass flowpath bypasses the engine core assembly. The condenser is configured to exchange heat energy between combustion products flowing within the core flowpath downstream of the combustor section and bypass air flowing within the bypass flowpath.

19 Claims, 8 Drawing Sheets

(56) References Cited

U.S. PATENT DOCUMENTS

| | | |
|---|---|---|
| 11,603,798 B1 | 3/2023 | Terwilliger |
| 11,635,022 B1 * | 4/2023 | Terwilliger .............. F02C 7/12 |
| | | 60/775 |
| 2012/0096869 A1 | 4/2012 | Kesseli |
| 2016/0123226 A1 | 5/2016 | Razak |
| 2017/0058834 A1 * | 3/2017 | Vaisman ................... F02K 3/06 |
| 2020/0088102 A1 | 3/2020 | Roberge |
| 2021/0207500 A1 * | 7/2021 | Klingels ................ F02C 3/305 |
| 2022/0178307 A1 | 6/2022 | Palmer |
| 2022/0195928 A1 | 6/2022 | Johnson |
| 2022/0333553 A1 * | 10/2022 | Zatorski .................... F02K 3/06 |
| 2023/0035231 A1 * | 2/2023 | Hu ....................... B01D 5/0075 |
| 2023/0150678 A1 | 5/2023 | Klingels |
| 2023/0258126 A1 * | 8/2023 | Terwilliger ............. F02C 1/005 |
| | | 60/39.182 |
| 2023/0280032 A1 * | 9/2023 | Clark ...................... F02C 7/224 |
| | | 60/730 |
| 2023/0392524 A1 * | 12/2023 | Terwilliger ............... F02C 3/22 |

FOREIGN PATENT DOCUMENTS

| | | | | |
|---|---|---|---|---|
| EP | 4303417 A1 * | 1/2024 | ........... | B64D 27/026 |
| GB | 2620439 A * | 1/2024 | ........... | B64D 27/026 |
| WO | 2022028652 A1 | 2/2022 | | |
| WO | WO-2024009097 A1 * | 1/2024 | ........... | B64D 27/026 |

* cited by examiner

GAS TURBINE ENGINE WITH WATER RECOVERY SYSTEM

TECHNICAL FIELD

This disclosure relates generally to an aircraft and, more particularly, to a turbine engine system for the aircraft.

BACKGROUND INFORMATION

There is interest in alternative fuels for gas turbine engines. There is interest, for example, in fueling a gas turbine engine with hydrogen rather than a traditional hydrocarbon fuel such as kerosine to reduce greenhouse emissions. Various systems and methods are known in the art for fueling a gas turbine engine with hydrogen. While these known systems and methods have various advantages, there is still room in the art for improvement.

SUMMARY

According to an aspect of the present disclosure, an engine system is provided that includes an open propulsor rotor, an engine core assembly, a bypass flowpath and a condenser. The engine core assembly is configured to drive rotation of the open propulsor rotor. The engine core assembly includes a core flowpath, a compressor section, a combustor section and a turbine section. The core flowpath extends through the compressor section, the combustor section and the turbine section from an inlet into the core flowpath to an exhaust from the core flowpath. The bypass flowpath bypasses the engine core assembly. The condenser is configured to exchange heat energy between combustion products flowing within the core flowpath downstream of the combustor section and bypass air flowing within the bypass flowpath.

According to another aspect of the present disclosure, another engine system is provided that includes an engine core assembly, a recovery system and a fuel system. The engine core assembly includes a core flowpath, a compressor section, a combustor section and a turbine section. The core flowpath extends through the compressor section, the combustor section and the turbine section from an inlet into the core flowpath to an exhaust from the core flowpath. The combustor section includes a combustor. The recovery system includes an evaporator and a recovery system turboexpander section. The evaporator is configured to exchange heat energy between combustion products flowing within the core flowpath downstream of the combustor section and water flowing within the recovery system to evaporate the water into steam. The recovery system turboexpander section includes a recovery system turboexpander rotor. The recovery system is configured to expand at least some of the steam across the recovery system turboexpander section to drive rotation of the recovery system turboexpander rotor. The fuel system includes a fuel flowpath, a fuel injector and a fuel system turboexpander section. The fuel flowpath is configured to direct fuel through the fuel system turboexpander section to the fuel injector. The fuel injector is configured to introduce the fuel into the combustor. The fuel system turboexpander section includes a fuel system turboexpander rotor. The fuel system is configured to expand the fuel flowing within the fuel flowpath across the fuel system turboexpander section to drive rotation of the fuel system turboexpander rotor.

According to still another aspect of the present disclosure, another engine system is provided that includes an un-ducted propulsor rotor, an engine core assembly, a fuel system, an internal second flowpath and a heat exchanger. The engine core assembly is configured to drive rotation of the un-ducted propulsor rotor. The engine core assembly includes a core flowpath, a compressor section, a combustor section and a turbine section. The core flowpath extends through the compressor section, the combustor section and the turbine section from an inlet into the core flowpath to an exhaust from the core flowpath. The combustor section includes a combustor. The fuel system includes a fuel flowpath and a fuel injector. The fuel flowpath is configured to direct hydrogen fuel to the fuel injector. The fuel injector is configured to introduce the hydrogen fuel into the combustor. The internal second flowpath extends around the engine core assembly. The heat exchanger is configured to exchange heat energy between a working fluid and air flowing within the internal second flowpath.

The working fluid may be combustion products flowing within the core flowpath downstream of the turbine section.

The engine system may also include an un-ducted propulsor rotor. At least one of the engine core assembly, the recovery system turboexpander rotor or the fuel system turboexpander rotor may be configured to drive rotation of the un-ducted propulsor rotor.

The engine system may also include a water separator. The condenser may be configured to condense water vapor flowing through the core flowpath into water. The water separator may be configured to collect the water within the core flowpath.

The engine system may also include a water reservoir fluidly coupled with the water separator. The water reservoir may be configured to store at least some of the water.

The engine system may also include a water recovery system including the condenser and the water separator. The water recovery system may be configured to direct at least some of the water to the engine core assembly.

The engine system may also include a water recovery system including the condenser, the water separator and an evaporator. The evaporator may be configured to evaporate at least some of the water into steam. The water recovery system may be configured to direct at least some of the steam to the engine core assembly.

The engine system may also include an evaporator configured to exchange heat energy between the combustion products flowing within the core flowpath and at least some of the water to evaporate the at least some of the water into steam.

The core flowpath may extend from the turbine section, through the evaporator and the condenser, to the exhaust from the core flowpath.

The engine system may also include a turboexpander section including a turboexpander rotor. The turboexpander section may be configured to expand at least some of the steam across the turboexpander rotor to drive rotation of the turboexpander rotor.

The turboexpander rotor may be configured to further drive rotation of the open propulsor rotor.

The engine system may also include a mechanical load mechanically powered by the turboexpander section.

The engine system may also include a fuel system including a fuel reservoir, a fuel flowpath and a fuel injector. The fuel flowpath may be configured to direct hydrogen fuel, received from the fuel reservoir, to the fuel injector. The fuel injector may be configured to introduce the hydrogen fuel into a combustor of the combustor section.

The fuel reservoir may be configured to contain a quantity of the hydrogen fuel in a liquid phase. The fuel system may be configured to direct the hydrogen fuel into the combustor in a gaseous phase through the fuel injector.

The engine system may also include a fuel system and a cooling circuit. The fuel system may include a fuel flowpath, a fuel-cooling air heat exchanger and a fuel injector. The fuel flowpath may be configured to direct fuel through the fuel-cooling air heat exchanger to the fuel injector. The fuel injector may be configured to introduce the fuel into a combustor of the combustor section. The cooling circuit may be configured to direct cooling air through the fuel-cooling air heat exchanger to the engine core assembly. The fuel-cooling air heat exchanger may be configured to exchange heat energy between the fuel flowing within the fuel flowpath and the cooling air flowing within the cooling circuit.

The cooling circuit may be configured to bleed core air from the core flowpath upstream of the combustor to provide the cooling air.

The cooling circuit may be configured to direct the cooling air to the turbine section.

The engine system may also include a fuel system including a fuel flowpath, a fuel-combustion products heat exchanger and a fuel injector. The fuel flowpath may be configured to direct fuel through the fuel-combustion products heat exchanger to the fuel injector. The fuel injector may be configured to introduce the fuel into a combustor of the combustor section. The fuel-combustion products heat exchanger may be configured to exchange heat energy between the fuel flowing within the fuel flowpath and the combustion products flowing within the core flowpath.

The fuel-combustion products heat exchanger may be downstream of the condenser along the core flowpath.

The fuel-combustion products heat exchanger may be upstream of the condenser along the core flowpath.

The fuel-combustion products heat exchanger may be integrated with the condenser along the core flowpath.

The engine system may also include a fuel system including a fuel flowpath, a fuel injector and a turboexpander section. The fuel flowpath may be configured to direct fuel through the turboexpander section to the fuel injector. The fuel injector may be configured to introduce the fuel into a combustor of the combustor section. The turboexpander section may include a turboexpander rotor. The fuel system may be configured to expand the fuel flowing within the fuel flowpath across the turboexpander section to drive rotation of the turboexpander rotor.

The turboexpander rotor may be configured to further drive rotation of the open propulsor rotor.

The engine system may also include a mechanical load mechanically powered by the turboexpander section.

The engine system may also include a fuel system including a fuel flowpath, an accumulator and a fuel injector. The fuel flowpath may be configured to direct fuel through the accumulator to the fuel injector. The fuel injector may be configured to introduce the fuel into a combustor of the combustor section.

The open propulsor rotor may be configured as or otherwise include a propeller rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
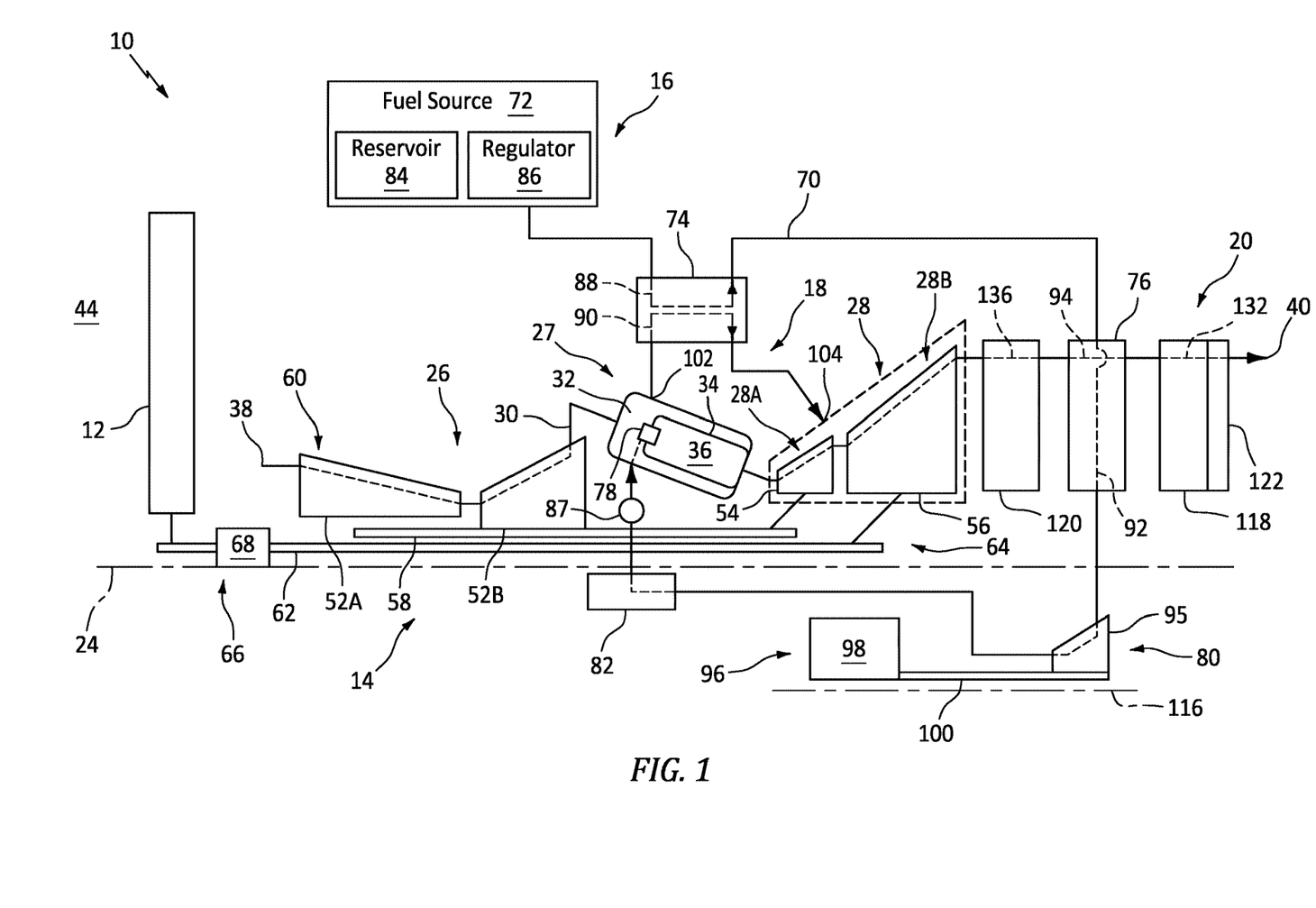
FIG. 1 is a partial schematic illustration of a gas turbine engine system for an aircraft.

FIG. 1 illustrates a gas turbine engine system 10 for an aircraft. The aircraft may be an airplane, a helicopter, a drone (e.g., an unmanned aerial vehicle (UAV)) or any other manned or unmanned aerial vehicle or system. The engine system 10 of FIG. 1 is configured as, or otherwise included as part of, an open rotor propulsion system for the aircraft. This engine system 10 includes an open propulsor rotor 12, an engine core assembly 14 and a fuel system 16. The engine system 10 may also include a cooling circuit 18 and/or a water recovery system 20 (see also FIG. 2).

Figure 2:
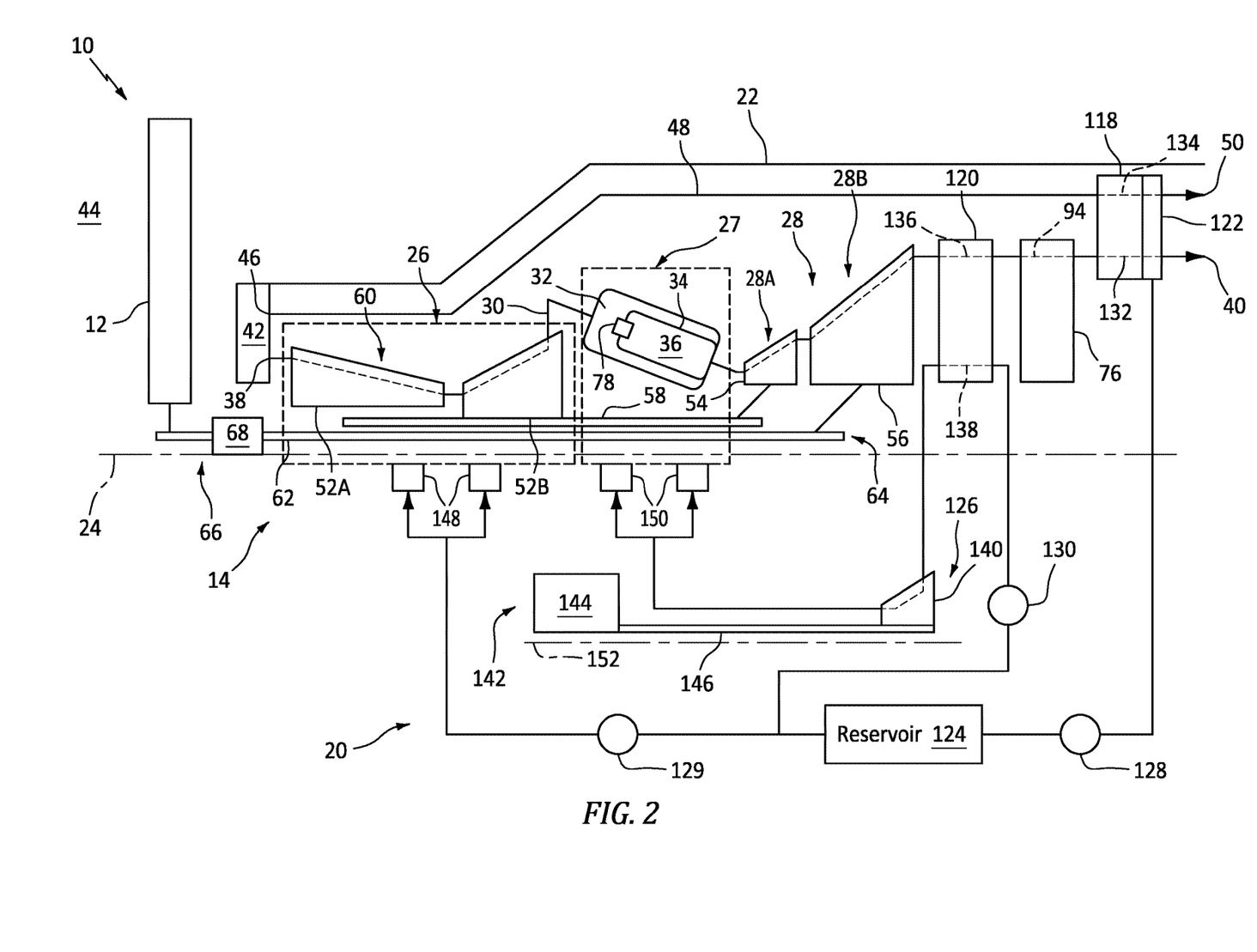
FIG. 2 is another partial schematic illustration of the gas turbine engine system.

The propulsor rotor 12 is configured as an open, un-ducted air mover for the aircraft propulsion system. Examples of the propulsor rotor 12 include a propeller rotor for a turboprop propulsion system, a rotorcraft rotor (e.g., a main helicopter rotor) for a turboshaft propulsion system, a propfan rotor for a propfan propulsion system, a pusher fan rotor for a pusher fan propulsion system, or any other type of un-ducted propulsor rotor. The propulsor rotor 12 includes a rotor disk (or hub) and a plurality of open, un-ducted propulsor blades arranged circumferentially around and connected to the rotor disk (or hub). Referring to FIG. 2, the propulsor rotor 12 and its propulsor blades are disposed outside of an engine housing 22 of the engine system 10. For ease of description, the propulsor rotor 12 may be generally described below as the propeller rotor for the turboprop propulsion system. The present disclosure, however, is not limited to such an arrangement. Moreover, it is contemplated the open propulsor rotor 12 may be replaced by a ducted propulsor rotor (e.g., a fan rotor, a compressor rotor, etc.) or a rotor for another type of mechanical load (e.g., a generator rotor for an electric power generator) in other embodiments.

The engine core assembly 14 is housed within the engine housing 22. Referring to FIG. 1, the engine core assembly 14 extends axially along an axis 24 between an upstream, forward end of the engine core assembly 14 and a downstream, aft end of the engine core assembly 14. The engine core assembly 14 includes a core compressor section 26, a core combustor section 27, a core turbine section 28 and a core flowpath 30. The combustor section 27 includes a plenum 32 (e.g., a diffuser plenum) and a combustor 34 (e.g., an annular combustor). Briefly, the combustor 34 includes an internal combustion chamber 36 (e.g., an annular combustion chamber), and is disposed within or otherwise adjacent the plenum 32. The turbine section 28 of FIG. 1 includes a high pressure turbine (HPT) section 28A and a low pressure turbine (LPT) section 28B; e.g., a power turbine (PT) section. The core flowpath 30 extends sequentially through the compressor section 26, the combustor section 27 (e.g., sequentially through the plenum 32 and the combustion chamber 36), the HPT section 28A and the LPT section 28B from an airflow inlet 38 into the core flowpath 30 to a combustion products exhaust 40 from the core flowpath 30. The core inlet 38 may be disposed at (e.g., on, adjacent or proximate) the assembly forward end, and the core exhaust 40 may be disposed at the assembly aft end.

Referring to FIG. 2, the core flowpath 30 and its core inlet 38 may be fluidly coupled with and downstream of an inlet duct 42 of the engine system 10. This inlet duct 42 is disposed within the engine housing 22 and is configured to direct air entering the engine system 10 from an environment 44 external to the aircraft (e.g., an outside, ambient environment) to the core inlet 38 and an inlet 46 into a bypass flowpath 48. The bypass flowpath 48 is also disposed within the engine housing 22. The bypass flowpath 48, however, bypass the engine core assembly 14 and, in particular, its engine sections 26-28B. The bypass flowpath 48 of FIG. 2, for example, extends from its bypass inlet 46, internally through the engine system 10, to an airflow exhaust 50 from the bypass flowpath 48. Here, the bypass exhaust 50 and the core exhaust 40 of FIG. 2 are discretely fluidly coupled to the external environment 44. The present disclosure, however, is not limited to such an exemplary arrangement. For example, in other embodiments, the core flowpath 30 and the bypass flowpath 48 may discretely receive air from the external environment 44. In addition or alternatively, the core flowpath 30 and the bypass flowpath 48 may be fluidly coupled to the external environment 44 through a common exhaust.

Referring to FIG. 1, the compressor section 26 includes one or more bladed compressor rotors 52A and 52B (generally referred to as "52"). The first stage compressor rotor 52A of FIG. 1 is configured as an axial flow compressor rotor; e.g., an axial inflow-axial outflow compressor rotor. The second stage compressor rotor 52B of FIG. 1 is configured as a radial flow compressor rotor; e.g., an axial inflow-radial outflow compressor rotor. Each of these compressor rotors 52 includes a plurality of compressor blades (e.g., compressor airfoils, compressor vanes, etc.) arranged circumferentially around and connected to at least (or only) one rotor disk or hub. The compressor rotors 52 are disposed in and arranged longitudinally along the core flowpath 30 between the core inlet 38 and the combustor section 27. The compressor blades, for example, are disposed in and extend across the core flowpath 30. Each rotor disk or hub is disposed adjacent (e.g., radially below) the core flowpath 30. The present disclosure, however, is not limited to the foregoing exemplary compressor section arrangement. For example, while the compressor section 26 is schematically shown in FIG. 1 with two stages, the compressor section 26 may alternatively include a single one of the stages or more than two stages. Moreover, while the compressor rotors 52 are respectively shown as axial and radial flow compressor rotors, any one or more of the compressor rotors 52 may alternatively be configured as an axial flow compressor rotor or a radial flow compressor rotor.

The HPT section 28A includes a blade high pressure turbine (HPT) rotor 54. The HPT rotor 54 of FIG. 1 is configured as an axial flow turbine rotor; e.g., an axial inflow-axial outflow turbine rotor. The HPT rotor 54 includes a plurality of turbine blades (e.g., turbine airfoils, turbine vanes, etc.) arranged circumferentially around and connected to at least (or only) one rotor disk or hub. The HPT rotor 54 is disposed in and arranged longitudinally along the core flowpath 30 between the combustor 34 and the LPT section 28B. The turbine blades, for example, are disposed in and extend across the core flowpath 30. The rotor disk or hub is disposed adjacent (e.g., radially below) the core flowpath 30. The present disclosure, however, is not limited to the foregoing exemplary HPT section arrangement. For example, while the HPT section 28A is schematically shown in FIG. 1 with a single stage, the HPT section 28A may alternatively include multiple stages. Moreover, while the HPT rotor 54 is shown as an axial flow turbine rotor, the HPT rotor 54 may alternatively be configured as a radial flow turbine rotor.

The LPT section 28B includes a blade low pressure turbine (LPT) rotor 56. The LPT rotor 56 of FIG. 1 is configured as an axial flow turbine rotor; e.g., an axial inflow-axial outflow turbine rotor. The LPT rotor 56 includes a plurality of turbine blades (e.g., turbine airfoils, turbine vanes, etc.) arranged circumferentially around and connected to at least (or only) one rotor disk or hub. The LPT rotor 56 is disposed in and arranged longitudinally along the core flowpath 30 between the HPT section 28A and the core exhaust 40. The turbine blades, for example, are disposed in and extend across the core flowpath 30. The rotor disk or hub is disposed adjacent (e.g., radially below) the core flowpath 30. The present disclosure, however, is not limited to the foregoing exemplary LPT section arrangement. For example, while the LPT section 28B is schematically shown in FIG. 1 with a single stage, the LPT section 28B may alternatively include multiple stages. Moreover, while the LPT rotor 56 is shown as an axial flow turbine rotor, the LPT rotor 56 may alternatively be configured as a radial flow turbine rotor.

The compressor rotors 52 are coupled to and rotatable with the HPT rotor 54. The compressor rotors 52 of FIG. 1, for example, are connected to the HPT rotor 54 by a high speed shaft 58. At least (or only) the compressor rotors 52, the HPT rotor 54 and the high speed shaft 58 collectively form a high speed rotating assembly 60; e.g., a high speed spool. The LPT rotor 56 is connected to a low speed shaft 62. At least (or only) the LPT rotor 56 and the low speed shaft 62 collectively form a low speed rotating assembly 64. This low speed rotating assembly 64 is further coupled to the propulsor rotor 12 through a drivetrain 66. This drivetrain 66 may be configured as a geared drivetrain, where a geartrain 68 (e.g., a transmission, a speed change device, an epicyclic geartrain, etc.) is disposed between and operatively couples the propulsor rotor 12 to the low speed rotating assembly 64 and its LPT rotor 56. With this arrangement, the propulsor rotor 12 may rotate at a different (e.g., slower) rotational velocity than the low speed rotating assembly 64 and its LPT rotor 56. However, the drivetrain 66 may alternatively be configured as a direct drive drivetrain, where the geartrain 68 is omitted. With this arrangement, the propulsor rotor 12 rotates at a common (the same) rotational velocity as the low speed rotating assembly 64 and its LPT rotor 56. Referring again to FIG. 1, each of the rotating assemblies 60, 64 and its members 52, 54 and 58, 56 and 62 may be rotatable about the axis 24. The axis 24 may thereby be a rotational axis and/or a centerline axis of the rotating assemblies 60 and 64 and their members 52, 54, 56, 58 and 62.

Figure 3:
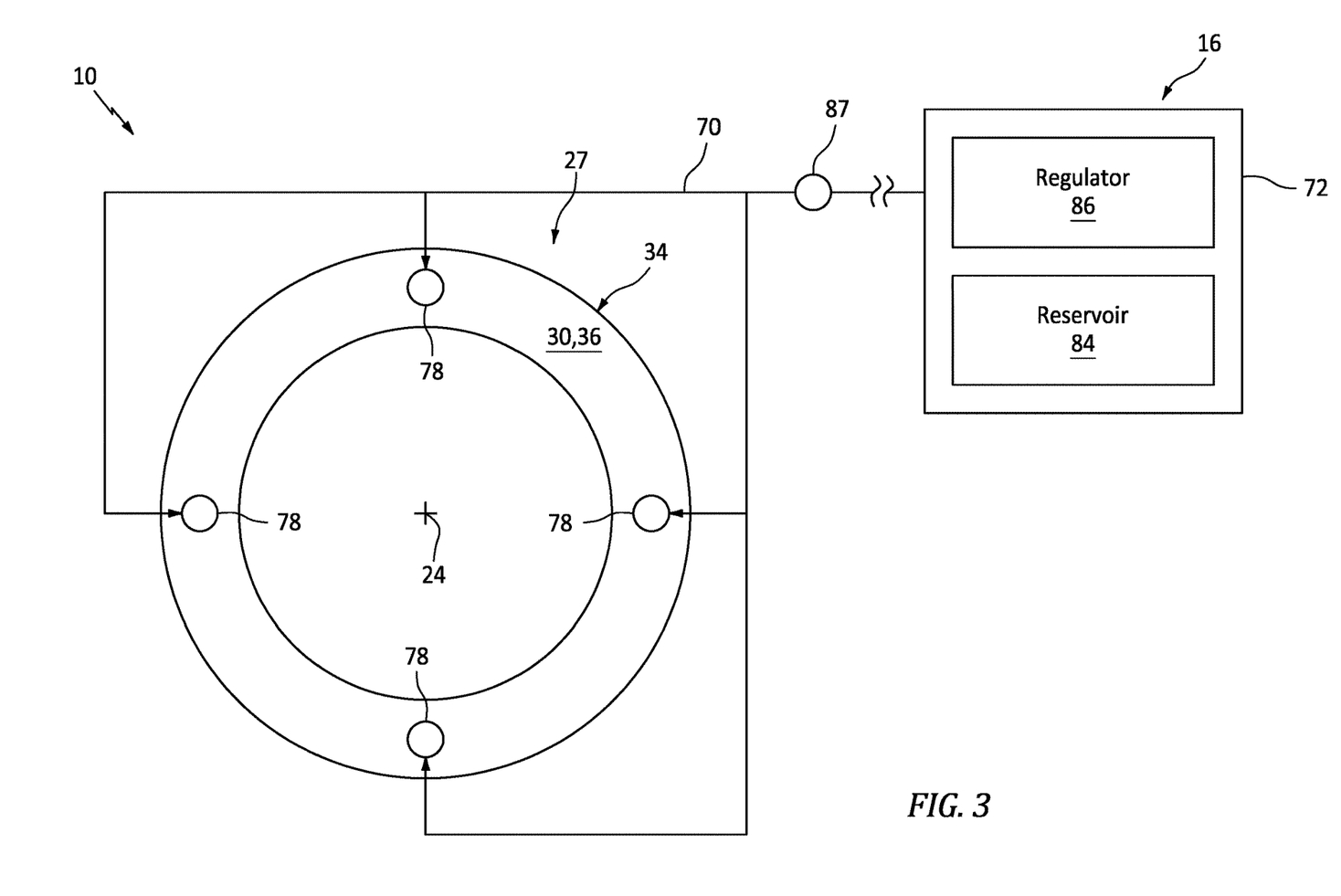
FIG. 3 is a partial schematic illustration of a fuel system arranged with a combustor section.

The fuel system 16 includes a fuel flowpath 70, a fuel source 72, one or more heat exchangers 74 and 76 and one or more fuel injectors 78 (see also FIG. 3). The fuel system 16 of FIG. 1 also includes a fuel system turboexpander section 80 (e.g., a fuel driven turbine section) and/or a fuel accumulator 82. The fuel flowpath 70 is fluidly coupled with an outlet from the fuel source 72 and an inlet to each fuel injector 78. This fuel flowpath 70 extends from the fuel source 72 and its outlet, sequentially through the fuel-cooling air heat exchanger 74 ("cooling air heat exchanger") (e.g., a compressor bleed air cooler, a turbine cooling air cooler, etc.), the fuel-combustion products heat exchanger 76 ("combustion products heat exchanger") (e.g., a recuperator for the core flowpath 30), the fuel system turboexpander section 80 and the fuel accumulator 82, to each fuel injector 78 and its inlet.

The fuel source 72 of FIG. 1 includes a fuel reservoir 84 and a fuel flow regulator 86. The fuel reservoir 84 is configured to store a quantity of fuel (e.g., in its liquid phase) before, during and/or after engine system operation. The fuel reservoir 84, for example, may be configured as or otherwise include a tank, a cylinder, a pressure vessel, a bladder or any other type of (e.g., insulated) fuel storage container. The fuel flow regulator 86 is configured to direct a flow of the fuel from the fuel reservoir 84 to one or more or all of the fuel injectors 78 through the fuel flowpath 70. The fuel flow regulator 86, for example, may be configured as or otherwise include a fuel compressor, a fuel pump and/or a fuel valve (or valves). The fuel system 16 may also include an additional fuel flow regulator 87 downstream of the fuel accumulator 82 to direct and/or meter the flow of fuel to the engine core assembly 14.

The cooling air heat exchanger 74 includes an internal fuel passage 88 and an internal cooling air passage 90 which is fluidly discrete from the fuel passage 88. The fuel passage 88 forms a portion of the fuel flowpath 70 which extends longitudinally through the cooling air heat exchanger 74. The cooling air passage 90 forms a portion of the cooling circuit 18 which extends longitudinally through the cooling air heat exchanger 74. The cooling air heat exchanger 74 of FIG. 1 is schematically shown as a single pass, parallel flow heat exchanger. The cooling air heat exchanger 74 of the present disclosure, however, is not limited to such an exemplary arrangement. The cooling air heat exchanger 74, for example, may alternatively be configured as cross flow heat exchanger or a counterflow heat exchanger or some hybridization or superposition of these general configurations. Moreover, the fuel passage 88 and/or the cooling air passage 90 may alternatively make two or more passes within the cooling air heat exchanger 74.

The combustion products heat exchanger 76 includes an internal fuel passage 92 and an internal combustion products passage 94 which is fluidly discrete from the fuel passage 92. The fuel passage 92 forms a portion of the fuel flowpath 70 which extends longitudinally through the combustion products heat exchanger 76. The combustion products passage 94 forms a portion of the core flowpath 30 which extends longitudinally through the combustion products heat exchanger 76. This portion of the core flowpath 30 formed by the combustion products passage 94 of FIG. 1 is arranged between the LPT rotor 56 and the core exhaust 40; e.g., within an exhaust section of the engine system 10. However, the combustion products heat exchanger 76 and its combustion products passage 94 may alternatively be arranged elsewhere along the core flowpath 30 downstream of the combustor section 27 in other embodiments. The combustion products heat exchanger 76 of FIG. 1 is schematically shown as a single pass, cross flow heat exchanger. The combustion products heat exchanger 76 of the present disclosure, however, is not limited to such an exemplary arrangement. The combustion products heat exchanger 76, for example, may alternatively be configured as parallel flow heat exchanger or a counterflow heat exchanger or some hybridization or superposition of these general configurations. Moreover, the fuel passage 92 and/or the combustion products passage 94 may alternatively make two or more passes within the combustion products heat exchanger 76.

The fuel system turboexpander section 80 includes a bladed fuel system turboexpander rotor 95 (e.g., a fuel driven turbine rotor). The fuel system turboexpander rotor 95 of FIG. 1 is configured as a radial flow turboexpander rotor; e.g., a radial inflow-axial outflow turboexpander rotor. The fuel system turboexpander rotor 95 includes a plurality of turbine blades (e.g., turbine airfoils, turbine vanes, etc.) arranged circumferentially around and connected to at least (or only) one rotor disk or hub. The fuel system turboexpander rotor 95 of FIG. 1 is disposed in and arranged longitudinally along the fuel flowpath 70 between (a) one or more of the fuel system members 72, 74 and/or 76 and (b) one or more of the fuel system members 78 and/or 82. The turbine blades, for example, are disposed in and extend across the fuel flowpath 70. The rotor disk or hub is disposed adjacent (e.g., radially below) the fuel flowpath 70. The present disclosure, however, is not limited to the foregoing exemplary turboexpander section arrangement. For example, while the fuel system turboexpander section 80 is shown in FIG. 1 with a single stage, the fuel system turboexpander section 80 may alternatively include multiple stages. Moreover, while the fuel system turboexpander rotor 95 is shown as a radial flow turboexpander rotor, the fuel system turboexpander rotor 95 may alternatively be configured as an axial flow turboexpander rotor.

Figure 4:
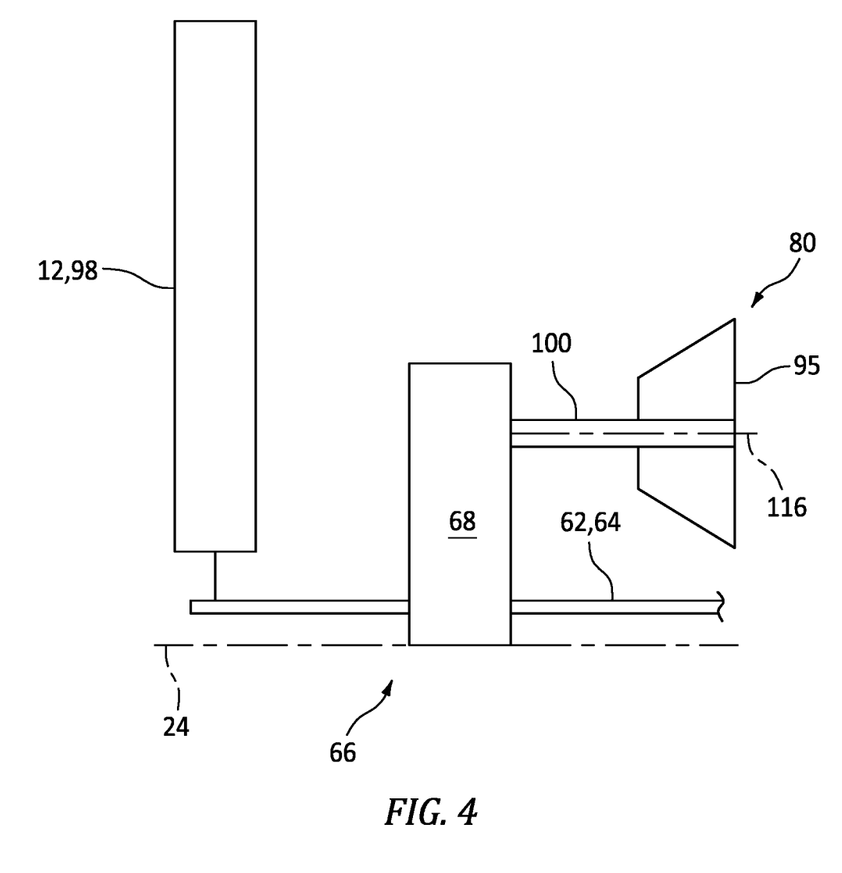
FIG. 4 is a partial schematic illustration of a fuel system turboexpander and a core rotating assembly coupled to a common mechanical load.

The fuel system turboexpander section 80 is configured to mechanically power a mechanical load 96. The fuel system turboexpander rotor 95 of FIG. 1, for example, is coupled to and rotatable with a rotor 98 of the mechanical load 96 through a drivetrain 100, which drivetrain 100 may be a geared drivetrain or a direct drive drivetrain as described above, for example. Referring to FIG. 4, the driven rotor 98 may be the same as the propulsor rotor 12. Both the fuel system turboexpander rotor 95 and the low speed rotating assembly 64 of FIG. 4, for example, are coupled to the propulsor rotor 12 through the geartrain 68. Thus, energy may be extracted from the fuel as described below in further detail to boost mechanical drive power to the propulsor rotor 12. Alternatively, referring again to FIG. 1, the driven rotor 98 may be discrete from the propulsor rotor 12. The driven rotor 98 of FIG. 1, for example, may be configured as a generator rotor in an electric power generator (or more generally an electric machine). This electric power generator may supply electricity to one or more components of the engine system 10 and/or one or more other aircraft components outside of the engine system 10.

The fuel accumulator 82 of FIG. 1 is configured as, or may otherwise include, a secondary fuel reservoir. This fuel accumulator 82 is configured to (e.g., temporarily) store a quantity of the fuel (e.g., in its gaseous phase) during engine system operation. The fuel accumulator 82 may also store the fuel before and/or after engine system operation. However, the quantity of the fuel stored by the fuel accumulator 82 is (e.g., significantly) less than the quantity of the fuel stored by the fuel reservoir 84 (when full). The fuel accumulator 82 of FIG. 1, for example, is configured to provide a temporary supply of the fuel for startup of the engine system 10 and/or for balancing out (e.g., evening out) possible fluctuations of fuel flow within the fuel flowpath 70. The fuel accumulator 82 may be configured as or otherwise include a tank, a cylinder, a pressure vessel, a bladder or any other type of fuel storage container.

Referring to FIG. 3, the fuel injectors 78 may be arranged circumferentially about the axis 24 in an array; e.g., a circular array. Each fuel injector 78 is configured to direct the fuel received from the fuel source 72 through the fuel flowpath 70 and metered by the fuel flow regulator 87, into the combustion chamber 36 for combustion. Note, while the fuel injectors 78 are schematically shown as discrete injectors, one or more of the fuel injectors 78 may alternatively be arcuate shaped, annular shaped or otherwise shaped and provided with multiple nozzle outlets; e.g., each fuel injector 78 may have a microjet configuration, a showerhead configuration or otherwise.

Figure 5:
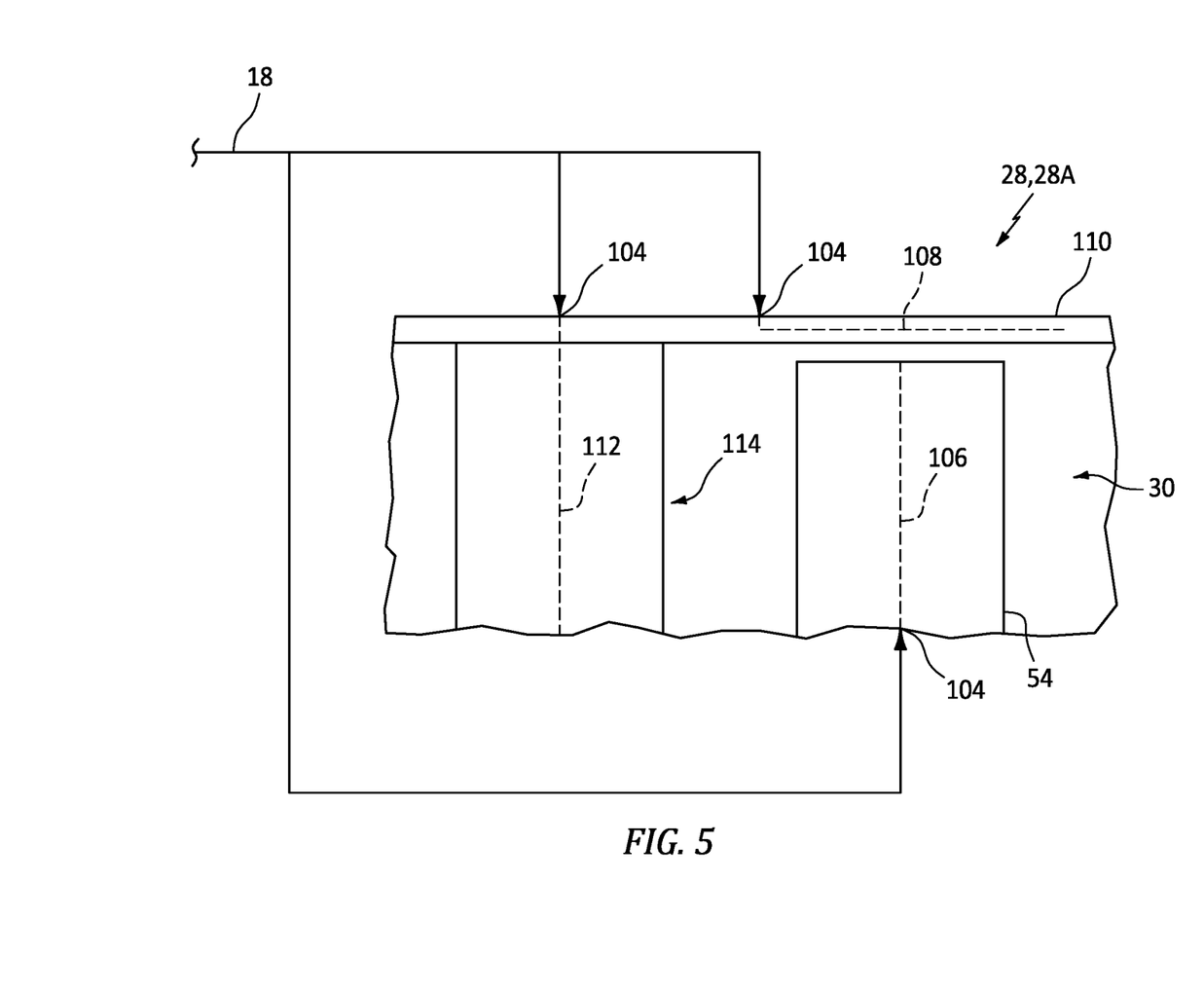
FIG. 5 is a partial schematic illustration of a cooling circuit delivering cooling air to one or more components within a turbine section.

Referring to FIG. 1, the cooling circuit 18 extends longitudinally from an inlet 102 into the cooling circuit 18, through the cooling air heat exchanger 74 and its cooling air passage 90, to an outlet 104 from the cooling circuit 18. The circuit inlet 102 is configured to bleed core air from the core flowpath 30. This circuit inlet 102 may be located along the core flowpath 30 downstream of the compressor section 26 and upstream of the combustor 34. The circuit inlet 102 of FIG. 1, for example, is disposed along the plenum 32 and is configured to bleed some of the core air from the plenum 32 before that core air is directed into the combustion chamber 36. Each circuit outlet 104, on the other hand, is configured to deliver the bled core air-cooling air-to one or more components of the engine system 10 for cooling those system components. The circuit outlet 104 of FIG. 1, for example, is configured to deliver the cooling air to one or more components within the turbine section 28; e.g., within the HPT section 28A and/or the LPT section 28B. For example, referring to FIG. 5, the cooling circuit 18 may be configured to deliver the cooling air to an internal passage 106 (or passages) within the HPT rotor 54. The cooling circuit 18 may also or alternatively be configured to deliver the cooling air to an internal passage 108 (or passages) within (or a cooling plenum adjacent) a shroud 110; e.g., a blade outer air seal (BOAS) and/or a flowpath wall. This shroud 110 may form a peripheral boundary of at least a portion of the core flowpath 30 within the turbine section 28 (e.g., the HPT section 28A). The shroud 110 may also circumscribe the HPT rotor 54. The cooling circuit 18 may still also or alternatively be configured to deliver the cooling air to an internal passage 112 (or passages) within a stator vane array 114 (e.g., a turbine inlet vane array, a combustor exit vane array) between the combustor 34 (see FIG. 1) and the HPT rotor 54.

Referring again to FIG. 1, the fuel delivered by the fuel system 16 to the combustor section 27 and its combustor 34 may be a non-hydrocarbon fuel; e.g., a hydrocarbon free fuel. The fuel system 16, for example, may direct hydrogen ($H_2$) fuel into the combustor 34 and into its combustion chamber 36. This hydrogen fuel may be stored within the fuel source 72 and its fuel reservoir 84 in a liquid phase. The fuel reservoir 84, in other words, may contain a quantity of the hydrogen fuel as liquid hydrogen ($H_2$). The hydrogen fuel, however, may be injected or otherwise introduced into the combustion chamber 36 by the fuel injectors 78 in a gaseous phase. The fuel injectors 78, in other words, may direct the hydrogen fuel into the combustion chamber 36 as gaseous hydrogen; e.g., hydrogen ($H_2$) gas.

During engine system operation, the fuel system 16 directs a flow of the hydrogen fuel (completely or substantially in its liquid phase) into the cooling air heat exchanger 74. The cooling circuit 18 also directs a flow of the cooling air (e.g., core air bled from the core flowpath 30/the plenum 32) into the cooling air heat exchanger 74. Here, a temperature of the cooling air entering the cooling air heat exchanger 74 is (e.g., significantly) higher than a temperature of the hydrogen fuel entering the cooling air heat exchanger 74.

The cooling air heat exchanger 74 may thereby transfer heat energy from the cooling air into the hydrogen fuel. This transfer of heat energy (heat transfer) from the cooling air to the hydrogen fuel cools the cooling air and heats the hydrogen fuel. The heating of the hydrogen fuel may facilitate a partial or complete phase change of the hydrogen fuel from the liquid phase to the gaseous phase. The cooling air may then be delivered to the turbine section 28 (e.g., the HPT section 28A) and its component(s) 54, 110, 114 (see FIG. 5) for air cooling those component(s) 54, 110, 114.

The fuel system 16 directs the flow of the hydrogen fuel (completely or substantially in its gaseous phase) within the fuel flowpath 70 from the cooling air heat exchanger 74 into the combustion products heat exchanger 76. The engine core assembly 14 also directs a flow of gas—combustion products—into the combustion products heat exchanger 76 as described below in further detail. Here, a temperature of the combustion products entering the combustion products heat exchanger 76 is (e.g., significantly) higher than a temperature of the hydrogen fuel entering the combustion products heat exchanger 76. The combustion products heat exchanger 76 may thereby transfer heat energy from the combustion products into the hydrogen fuel. This transfer of heat energy (heat transfer) from the combustion products to the hydrogen fuel cools the combustion products and further heats the hydrogen fuel. The heating of the hydrogen fuel may facilitate a complete phase change of the hydrogen fuel from the liquid phase to the gaseous phase. Moreover, the transfer of heat energy recuperates energy from the combustion products which may be utilized for powering the fuel system turboexpander section 80 and/or preparing the hydrogen fuel for combustion as described below.

The fuel system 16 directs the heated hydrogen fuel (in its gaseous phase) within the fuel flowpath 70 from the combustion products heat exchanger 76 to the fuel system turboexpander section 80 for expansion across the fuel system turboexpander rotor 95. Within the fuel system turboexpander section 80, the expansion of the hydrogen fuel may drive rotation of the fuel system turboexpander rotor 95 about its rotational axis 116. The rotation of the fuel system turboexpander rotor 95 may drive rotation of the driven rotor 98; e.g., the propulsor rotor 12 or a generator rotor. The fuel system 16 subsequently directs the expanded hydrogen fuel within the fuel flowpath 70 from the fuel system turboexpander section 80, through the fuel accumulator 82, to the fuel injectors 78 for injection into the combustion chamber 36.

Concurrently during the engine system operation, air is directed across the propulsor rotor 12 and into the core flowpath 30. The air entering the core flowpath 30 may be referred to as the core air. This core air is compressed by the compressor rotors 52 before being diffused within the plenum 32 and directed into the combustor 34 and its combustion chamber 36. The hydrogen fuel supplied by the fuel injectors 78 and the compressed core air are mixed within the combustion chamber 36 to provide a fuel-air mixture. This fuel-air mixture is ignited and combustion products thereof flow through and sequentially cause the HPT rotor 54 and the LPT rotor 56 to rotate. The combustion products may then be directed through the combustion products heat exchanger 76 and exhausted from the engine system 10 through the core exhaust 40. The rotation of the HPT rotor 54 drives rotation of the compressor rotors 52 and, thus, compression of the air directed into the core flowpath 30 through the core inlet 38. The rotation of the LPT rotor 56 drives rotation of the propulsor rotor 12. The rotation of the propulsor rotor 12 may propel additional air (e.g., outside air) outside of and axially along the engine core assembly 14 (e.g., and the engine housing 22; see FIG. 2) to provide aircraft thrust. The propulsion of this additional air may account for a majority of the aircraft thrust generated by the engine system 10.

The combustion products generated by the combustion of the fuel-air mixture within the combustion chamber 36 includes water ($H_2O$) vapor. Referring to FIG. 2, the recovery system 20 is configured to recover at least some of the water vapor produced by the combustion of the fuel-air mixture within the combustion chamber 36 and/or water vapor from water previously introduced into the core flowpath 30 as discussed below in further detail; e.g., water introduced for cooling, NOx reduction, etc. The recovery system 20 may also be configured to evaporate the recovered water using heat energy recuperated from the combustion products to provide steam for use in the engine core assembly 14; e.g., in the combustor section 27. The recovery system 20 of FIG. 2 includes one or more heat exchangers 118 and 120 and a water separator 122. The recovery system 20 may also include a water reservoir 124, a recovery system turboexpander section 126 and/or one or more flow regulators 128-130; e.g., compressors, pumps and/or valves.

The condensing heat exchanger 118 ("condenser") includes an internal combustion products passage 132 and an internal bypass air passage 134 which is fluidly discrete from the combustion products passage 132. The combustion products passage 132 forms a portion of the core flowpath 30 which extends longitudinally through the condenser 118. This portion of the core flowpath 30 formed by the combustion products passage 132 of FIG. 2 is arranged between the LPT rotor 56 and the core exhaust 40; e.g., within the exhaust section of the engine system 10. Here, the condenser 118 is arranged along the core flowpath 30 downstream of the combustion products heat exchanger 76. However, the condenser 118 and its combustion products passage 132 may alternatively be arranged elsewhere along the core flowpath 30 downstream of the combustor section 27 in other embodiments. In other embodiments, for example, the combustion products heat exchanger 76 may be arranged along the core flowpath 30 downstream of the condenser 118. Referring again to FIG. 2, the bypass air passage 134 forms a portion of the bypass flowpath 48 which extends longitudinally through the condenser 118. The condenser 118 of FIG. 2 is schematically shown as a single pass, parallel flow heat exchanger. The condenser 118 of the present disclosure, however, is not limited to such an exemplary arrangement. The condenser 118, for example, may alternatively be configured as counterflow heat exchanger or a crossflow heat exchanger or some hybridization or superposition of these general configurations. Moreover, the combustion products passage 132 and/or the bypass air passage 134 may alternatively make two or more passes within the condenser 118.

The evaporating heat exchanger 120 ("evaporator") includes an internal combustion products passage 136 and an internal fluid (e.g., water-to-steam) passage 138 which is fluidly discrete from the combustion products passage 136. The combustion products passage 136 forms a portion of the core flowpath 30 which extends longitudinally through the evaporator 120. This portion of the core flowpath 30 formed by the combustion products passage 136 of FIG. 2 is arranged between the LPT rotor 56 and the core exhaust 40; e.g., within the exhaust section of the engine system 10. Here, the evaporator 120 is arranged along the core flowpath 30 upstream of the combustion products heat exchanger 76 and/or the condenser 118. However, the evaporator 120 and its combustion products passage 136 may alternatively be arranged elsewhere along the core flowpath 30 downstream of the combustor section 27 in other embodiments. The evaporator 120 of FIG. 2 is schematically shown as a single pass, parallel flow heat exchanger. The evaporator 120 of the present disclosure, however, is not limited to such an exemplary arrangement. The evaporator 120, for example, may alternatively be configured as counterflow heat exchanger or a crossflow heat exchanger or some hybridization or superposition of these general configurations. Moreover, the combustion products passage 136 and/or the fluid passage 138 may alternatively make two or more passes within the evaporator 120.

The water separator 122 may be a passive water separator. The water separator 122, for example, may be configured as or may otherwise include an impingement and/or condensation surface and a gutter arranged with and/or downstream of the condenser 118. However, various other types of separators are known in the art, and the present disclosure is not limited to any particular ones thereof. Moreover, the present disclosure is not limited to passive water separator arrangements. The water separator 122, for example, may alternatively be a centrifugal water separator or otherwise.

The water reservoir 124 is configured to store a quantity of water before, during and/or after engine system operation. The water reservoir 124, for example, may be configured as or otherwise include a tank, a cylinder, a pressure vessel, a bladder or any other type of water storage container.

The recovery system turboexpander section 126 includes a bladed recovery system turboexpander rotor 140 (e.g., a steam driven turbine rotor). The recovery system turboexpander rotor 140 of FIG. 2 is configured as a radial flow turboexpander rotor; e.g., a radial inflow-axial outflow turboexpander rotor. The recovery system turboexpander rotor 140 includes a plurality of turbine blades (e.g., turbine airfoils, turbine vanes, etc.) arranged circumferentially around and connected to at least (or only) one rotor disk or hub. The present disclosure, however, is not limited to the foregoing exemplary turboexpander section arrangement. For example, while the recovery system turboexpander section 126 is shown in FIG. 2 with a single stage, the recovery system turboexpander section 126 may alternatively include multiple stages. Moreover, while the recovery system turboexpander rotor 140 is shown as a radial flow turboexpander rotor, the recovery system turboexpander rotor 140 may alternatively be configured as an axial flow turboexpander rotor.

Figure 6:
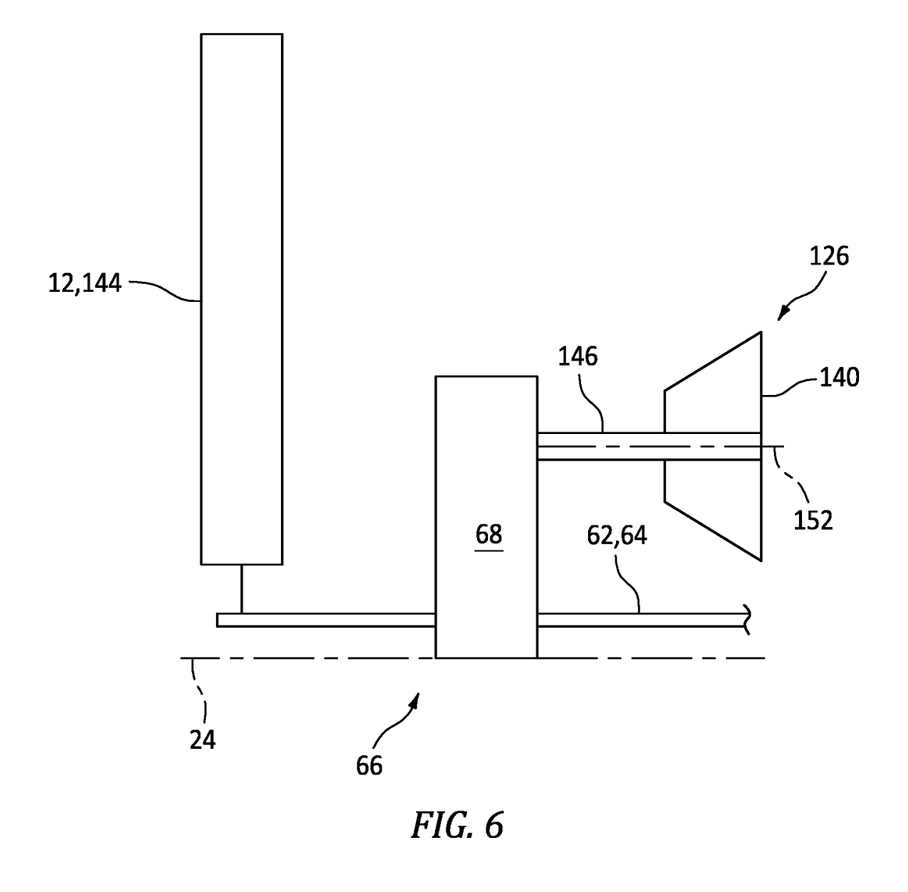
FIG. 6 is a partial schematic illustration of a water recovery system turboexpander and the core rotating assembly coupled to a common mechanical load.

The recovery system turboexpander section 126 is configured to mechanically power a mechanical load 142. The recovery system turboexpander rotor 140 of FIG. 2, for example, is coupled to and rotatable with a rotor 144 of the mechanical load 142 through a drivetrain 146, which drivetrain 146 may be a geared drivetrain or a direct drive drivetrain as described above, for example. Referring to FIG. 6, the driven rotor 144 may be the same as the propulsor rotor 12. Both the recovery system turboexpander rotor 140 and the low speed rotating assembly 64 of FIG. 6, for example, are coupled to the propulsor rotor 12 through the geartrain 68. Thus, energy may be extracted from steam as described below in further detail to boost mechanical drive power to the propulsor rotor 12. Alternatively, referring again to FIG. 2, the driven rotor 144 may be discrete from the propulsor rotor 12. The driven rotor 144 of FIG. 2, for example, may be configured as a generator rotor in an electric power generator (or more generally an electric machine). This electric power generator may supply electricity to one or more components of the engine system 10 and/or one or more other aircraft components outside of the engine system 10.

An inlet to the water reservoir 124 is fluidly coupled with an outlet from the water separator 122 through, for example, the first flow regulator 128. An outlet from the water reservoir 124 is fluidly coupled with one or more components 148 of the engine core assembly 14 through, for example, the second flow regulator 129. One or more of the turbine engine components 148 may each be configured as or otherwise include a water injector. Each water injector may be configured to provide the water to the compressor section 26; e.g., for injection into the core flowpath 30. The present disclosure, however, is not limited to the foregoing exemplary turbine engine components which utilize the water. In particular, various other uses for water in a turbine engine are known in the art, and the present disclosure is not limited to any particular one thereof.

The outlet from the water reservoir 124 is also fluidly coupled with an inlet into the evaporator 120 and its fluid passage 138 through the third flow regulator 130. An outlet from the evaporator 120 and its fluid passage 138 is fluidly coupled with one or more additional components 150 of the engine core assembly 14 through, for example, the recovery system turboexpander section 126. One or more of the turbine engine components 150 may each be configured as or otherwise include a steam injector. Each steam injector may be configured to provide the steam to the combustor section 27; e.g., for injection into the core flowpath 30/the combustion chamber 36. The present disclosure, however, is not limited to the foregoing exemplary turbine engine components which utilize the steam. In particular, various other uses for steam in a turbine engine are known in the art, and the present disclosure is not limited to any particular one thereof.

During operation of the recovery system 20 of FIG. 2, the engine core assembly 14 directs a flow of the combustion products into the condenser 118 and its combustion products passage 132. The bypass flowpath 48 also directs a flow of bypass air (air flowing within the bypass flowpath 48 and bypassing the engine core assembly 14) into the condenser 118 and its bypass air passage 134. Here, a temperature of the combustion products entering the condenser 118 is (e.g., significantly) higher than a temperature of the bypass air entering the condenser 118. The condenser 118 may thereby transfer heat energy from the combustion products into the bypass air. This transfer of heat energy (heat transfer) from the combustion products to the bypass air cools the combustion products and heats the bypass air. The cooling of the combustion products may facilitate condensation of the water vapor in the combustion products into droplets of water. This water is collected by the water separator 122 and directed through the first flow regulator 128 into the water reservoir 124.

At least some of the water stored within the water reservoir 124 may be directed to the engine components 148 through the second flow regulator 129. This second flow regulator 129 may meter or otherwise regulate (e.g., turn on or off) the flow of the water from the water reservoir 124 to the engine components 148.

At least some of the water stored within the water reservoir 124 may also or alternatively be directed into the evaporator 120 and its fluid passage 138 through the third flow regulator 130. This third flow regulator 130 may meter or otherwise regulate (e.g., turn on or off) the flow of the water from the water reservoir 124 to the evaporator 120. The engine core assembly 14 also directs a flow of the combustion products into the evaporator 120 and its combustion products passage 136. Here, a temperature of the combustion products entering the evaporator 120 is (e.g., significantly) higher than a temperature of the water entering the evaporator 120. The evaporator 120 may thereby transfer heat energy from the combustion products into the water. This transfer of heat energy (heat transfer) from the combustion products to the water cools the combustion products and heats the water. The heating of the water may facilitate evaporation and/or superheating of at least some or all of the water into steam. This (e.g., superheated) steam is directed through the recovery system turboexpander section 126 to the engine components 150. Within the recovery system turboexpander section 126, the steam is expanded across the recovery system turboexpander rotor 140. This expansion of the steam may drive rotation of the recovery system turboexpander rotor 140 about its rotational axis 152. The rotation of the recovery system turboexpander rotor 140 may drive rotation of the driven rotor 144; e.g., the propulsor rotor 12 or a generator rotor.

The engine system 10 of FIG. 1 and its fuel system 16 are described above with multiple heat exchangers 74 and 76. It is contemplated, however, any one or more of the heat exchangers 74, 76 may be omitted depending on engine system parameters and/or requirements. The present disclosure therefore is not limited to the exemplary fuel system arrangement of FIG. 1.

Figure 7:
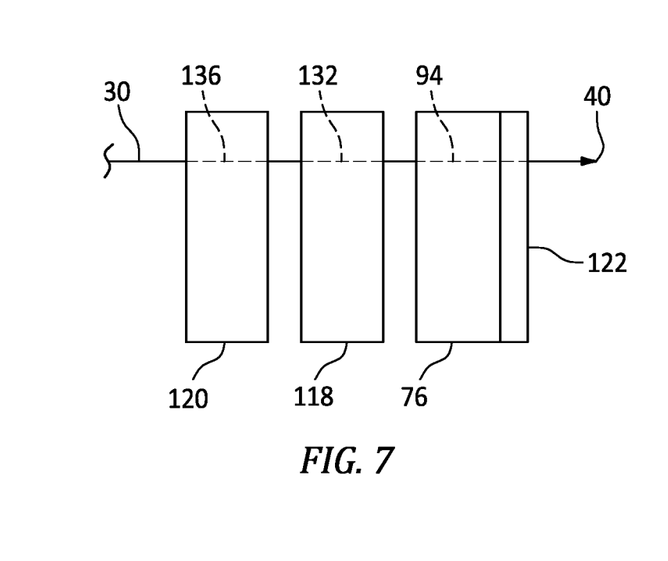
FIGS. 7 and 8 are schematic illustrations of various arrangements of heat exchangers along a core flowpath.
Figure 8:
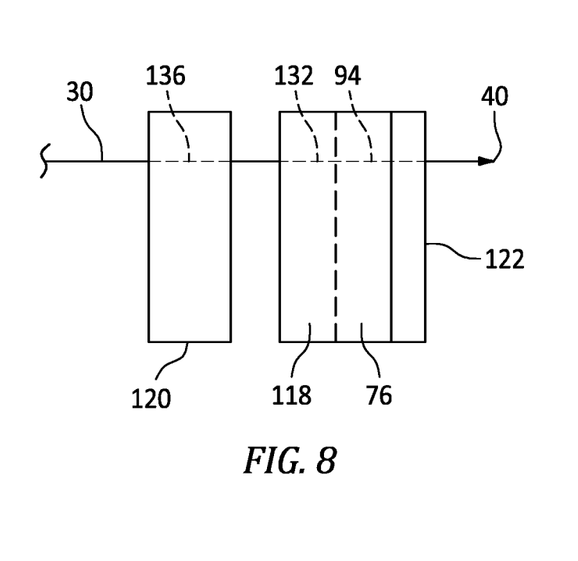

In some embodiments, referring to FIGS. 1 and 2, the fuel-combustion products heat exchanger 76 may be configured discrete from the condensing heat exchanger 118. In such embodiments, the fuel-combustion products heat exchanger 76 may be arranged upstream of the condensing heat exchanger 118 along the core flowpath 30. Alternatively, referring to FIG. 7, the condensing heat exchanger 118 may be arranged upstream of the fuel-combustion products heat exchanger 76 along the core flowpath 30. The fuel-combustion products heat exchanger 76 of FIG. 7, for example, is arranged between the condensing heat exchanger 118 and the water separator 122. In other embodiments, referring to FIG. 8, the fuel-combustion products heat exchanger 76 and the condensing heat exchanger 118 may be integrated in to a single (e.g., multi-function) heat exchanger structure.

Figure 9:
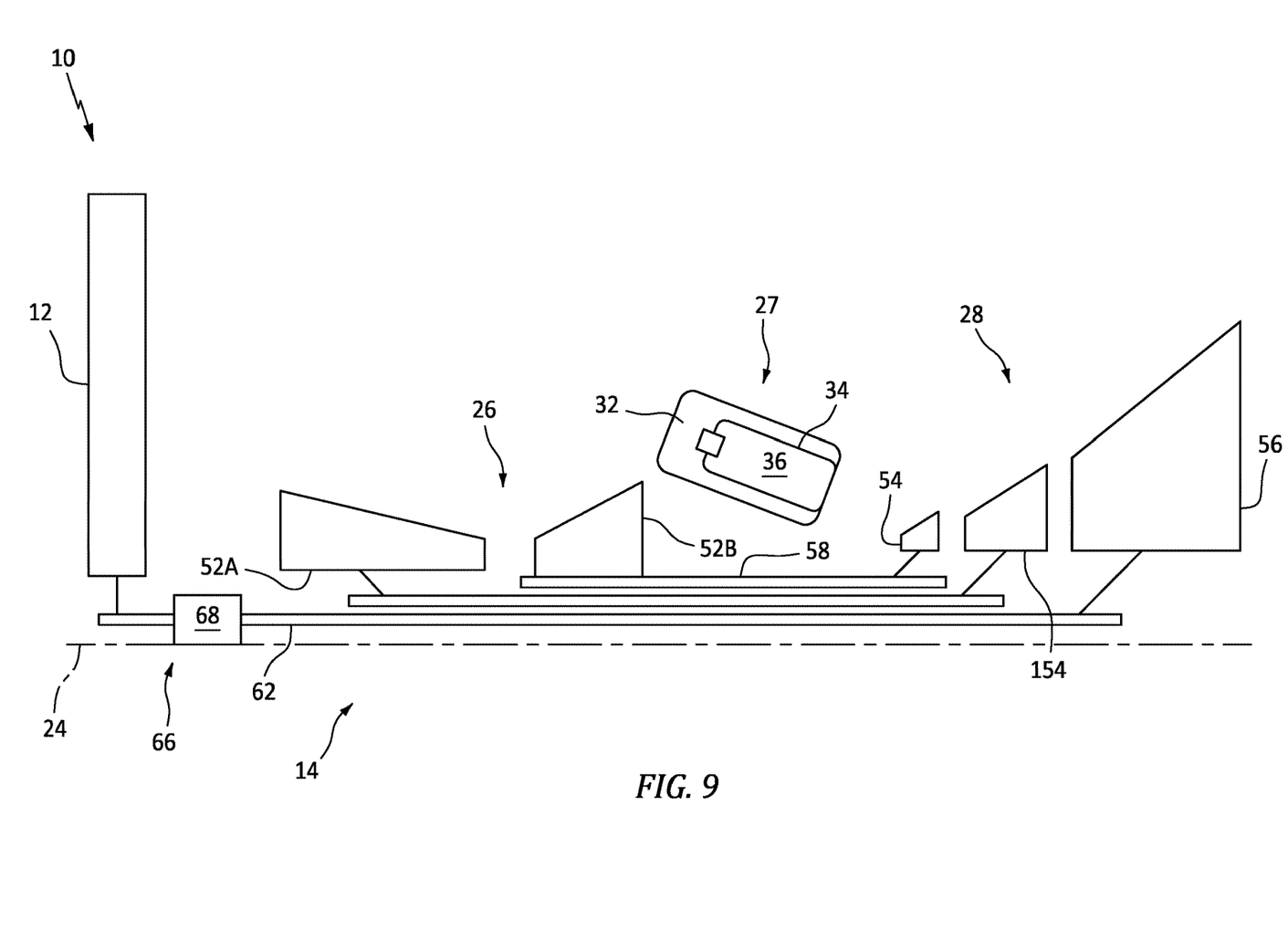
FIG. 9 is a partial schematic illustration of the gas turbine engine with three rotating assemblies.

The engine core assembly 14 is shown in FIG. 1 with two rotating assemblies 60 and 64. It is contemplated, however, the engine core assembly 14 may alternatively be configured with a single rotating assembly, or with three or more rotating assemblies. The engine core assembly 14 of FIG. 9, for example, is configured with an additional turbine rotor 154 (e.g., an intermediate pressure turbine (IPT) rotor) coupled to and configured to drive rotation of the compressor rotor 52A.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An engine system, comprising:
   an open propulsor rotor;

an inlet duct upstream of and fluidly coupled in parallel with a core inlet and a bypass inlet;

an engine core assembly configured to drive rotation of the open propulsor rotor, the engine core assembly including a core flowpath, a compressor section, a combustor section and a turbine section, and the core flowpath extending through the compressor section, the combustor section and the turbine section from the core inlet into the core flowpath to an exhaust from the core flowpath;

a bypass flowpath bypassing the engine core assembly and extending along a length of the core engine assembly;

a condenser configured to exchange heat energy between combustion products flowing within the core flowpath downstream of the combustor section and bypass air flowing within the bypass flowpath; and a housing, wherein the engine core assembly and the bypass flowpath are disposed in the housing, the bypass flowpath extending from the bypass inlet, internally through the engine system, to a bypass exhaust, the housing extending along the length of the core engine assembly, and the open propulsor rotor is configured to propel additional air outside of and along the housing to provide thrust.

2. The engine system of claim 1, further comprising:
a water separator;
the condenser configured to condenser water vapor flowing through the core flowpath into water; and
the water separator configured to collect the water within the core flowpath.

3. The engine system of claim 2, further comprising:
a water reservoir fluidly coupled with the water separator;
the water reservoir configured to store at least some of the water.

4. The engine system of claim 2, further comprising:
a water recovery system including the condenser and the water separator;
the water recovery system configured to direct at least some of the water to the engine core assembly.

5. The engine system of claim 2, further comprising:
a water recovery system including the condenser, the water separator and an evaporator;
the evaporator configured to evaporate at least some of the water into steam; and
the water recovery system configured to direct at least some of the steam to the engine core assembly.

6. The engine system of claim 2, further comprising an evaporator configured to exchange heat energy between the combustion products flowing within the core flowpath and at least some of the water to evaporate the at least some of the water into steam.

7. The engine system of claim 6, further comprising a turboexpander section comprising a turboexpander rotor;
the turboexpander section configured to expand at least some of the steam across the turboexpander rotor to drive rotation of the turboexpander rotor.

8. The engine system of claim 7, wherein the turboexpander rotor is configured to further drive rotation of the open propulsor rotor.

9. The engine system of claim 7, further comprising a mechanical load mechanically powered by the turboexpander section.

10. The engine system of claim 1, further comprising:
a fuel system including a fuel reservoir, a fuel flowpath and a fuel injector;
the fuel flowpath configured to direct hydrogen fuel, received from the fuel reservoir, to the fuel injector; and
the fuel injector configured to introduce the hydrogen fuel into a combustor of the combustor section.

11. The engine system of claim 1, further comprising:
a fuel system including a fuel flowpath, a fuel-cooling air heat exchanger and a fuel injector, the fuel flowpath configured to direct fuel through the fuel-cooling air heat exchanger to the fuel injector, and the fuel injector configured to introduce the fuel into a combustor of the combustor section; and
a cooling circuit configured to direct cooling air through the fuel-cooling air heat exchanger to the engine core assembly;
the fuel-cooling air heat exchanger configured to exchange heat energy between the fuel flowing within the fuel flowpath and the cooling air flowing within the cooling circuit.

12. The engine system of claim 1, further comprising:
a fuel system including a fuel flowpath, a fuel-combustion products heat exchanger and a fuel injector, the fuel flowpath configured to direct fuel through the fuel-combustion products heat exchanger to the fuel injector, and the fuel injector configured to introduce the fuel into a combustor of the combustor section; and
the fuel-combustion products heat exchanger configured to exchange heat energy between the fuel flowing within the fuel flowpath and the combustion products flowing within the core flowpath.

13. The engine system of claim 1, further comprising:
a fuel system including a fuel flowpath, a fuel injector and a turboexpander section;
the fuel flowpath configured to direct fuel through the turboexpander section to the fuel injector;
the fuel injector configured to introduce the fuel into a combustor of the combustor section;
the turboexpander section comprising a turboexpander rotor, and the fuel system configured to expand the fuel flowing within the fuel flowpath across the turboexpander section to drive rotation of the turboexpander rotor.

14. The engine system of claim 13, wherein the turboexpander rotor is configured to further drive rotation of the open propulsor rotor.

15. The engine system of claim 13, further comprising a mechanical load mechanically powered by the turboexpander section.

16. The engine system of claim 1, further comprising a fuel system including a fuel flowpath, an accumulator and a fuel injector, the fuel flowpath configured to direct fuel through the accumulator to the fuel injector, and the fuel injector configured to introduce the fuel into a combustor of the combustor section.

17. The engine system of claim 1, wherein the open propulsor rotor comprises a propeller rotor.

18. An engine system, comprising:
an un-ducted propulsor rotor;
an engine core assembly configured to drive rotation of the un-ducted propulsor rotor, the engine core assembly including a core flowpath, a compressor section, a combustor section and a turbine section, the core flowpath extending through the compressor section, the combustor section and the turbine section from an inlet into the core flowpath to an exhaust from the core flowpath, and the combustor section comprising a combustor;

a fuel system including a fuel flowpath and a fuel injector, the fuel flowpath configured to direct hydrogen fuel to the fuel injector, and the fuel injector configured to introduce the hydrogen fuel into the combustor;

an internal second flowpath extending around the engine core assembly and along a length of the core engine assembly, the internal second flowpath disposed within an engine housing, the engine housing disposed radially outboard of and extending along a length of the core engine assembly, and the internal second flowpath including an internal second flowpath inlet disposed in parallel with the inlet into the core flowpath; and a heat exchanger configured to exchange heat energy between a working fluid and air flowing within the internal second flowpath;

wherein the un-ducted propulsor rotor is configured to propel air outside of the engine system axially along the engine core assembly and the internal second flowpath.

19. An engine system, comprising:

an open propulsor rotor;

an engine core assembly configured to drive rotation of the open propulsor rotor, the engine core assembly including a core flowpath, a compressor section, a combustor section and a turbine section, and the core flowpath extending through the compressor section, the combustor section and the turbine section from an inlet into the core flowpath to an exhaust from the core flowpath;

a bypass flowpath bypassing the engine core assembly and extending along a length of the core engine assembly;

a water recovery system including a condenser, a water separator, a water reservoir, an evaporator, a first flow regulator and a second flow regulator, the condenser configured to exchange heat energy between combustion products flowing within the core flowpath downstream of the combustor section and bypass air flowing within the bypass flowpath, the condenser configured to condense water vapor flowing through the core flowpath into water, the water separator configured to collect the water within the core flowpath, the water reservoir fluidly coupled with the water separator, the water reservoir configured to store at least some of the water, the evaporator configured to evaporate at least some of the water into steam, an outlet of the water reservoir fluidly coupled with one or more components of the core engine assembly through the first flow regulator, the outlet of the water reservoir fluidly coupled with the evaporator through the second flow regulator, and the water recovery system configured to direct at least some of the steam to the engine core assembly; and a housing, wherein the engine core assembly and the bypass flowpath are disposed in the housing, the housing extending along the length of the core engine assembly, and the open propulsor rotor is configured to propel additional air outside of and along the housing to provide thrust.

* * * * *